Sept. 14, 1948.  E. CRABTREE  2,449,455
ADAPTER FOR SPOT WELDING MACHINES

Filed Jan. 2, 1947  2 Sheets-Sheet 1

INVENTOR
E. CRABTREE
By: Fetherstonhaugh & Co.
ATT'YS

Sept. 14, 1948.　　　　　E. CRABTREE　　　　　2,449,455
ADAPTER FOR SPOT WELDING MACHINES
Filed Jan. 2, 1947　　　　　　　　　　　　　　2 Sheets-Sheet 2
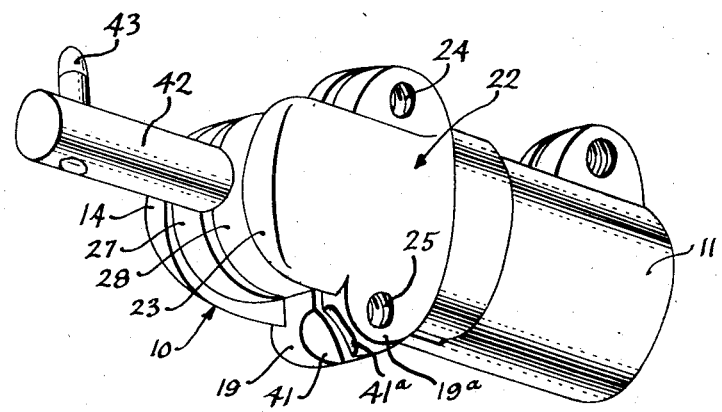
Fig. 7
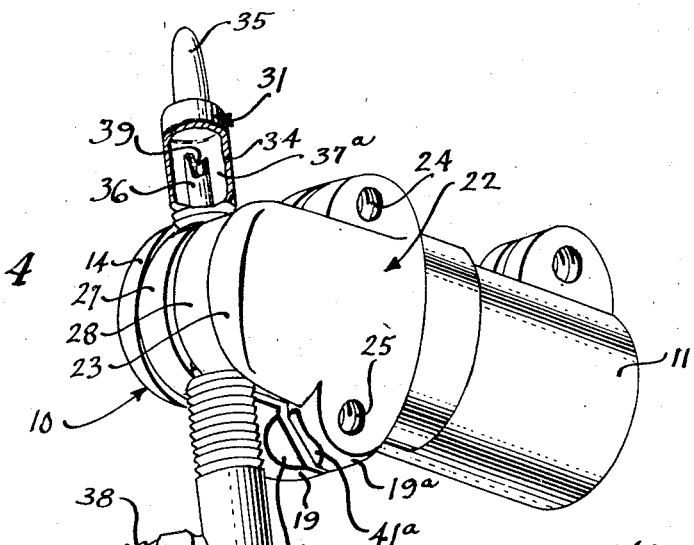
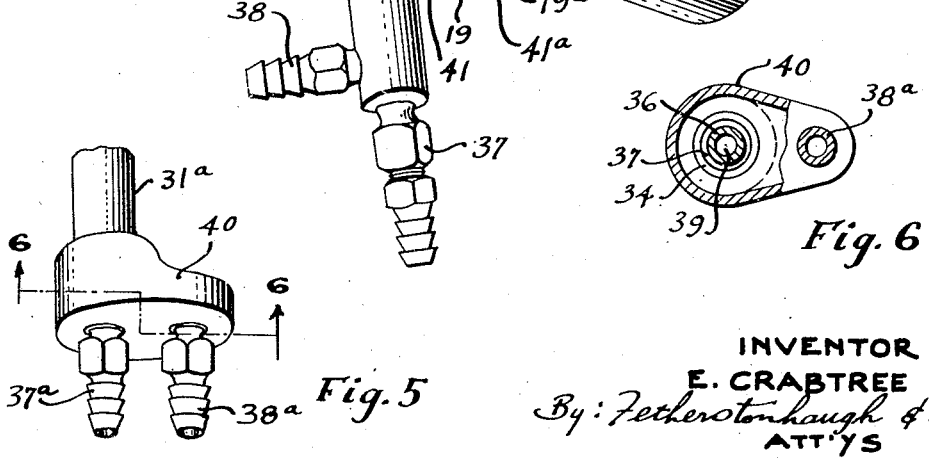
INVENTOR
E. CRABTREE
By: Fetherstonhaugh & Co.
ATT'YS Patented Sept. 14, 1948

2,449,455

UNITED STATES PATENT OFFICE 2,449,455

ADAPTER FOR SPOT WELDING MACHINES

Ernest Crabtree, Toronto, Ontario, Canada

Application January 2, 1947, Serial No. 719,709

6 Claims. (Cl. 219—4)

This invention relates to electric welding apparatus and more particularly to an adapter for spot welding machines such as are commonly employed for bonding sheet metal parts and the like together.

Spot welding machines usually are fitted with copper arms which mount holders for electrodes usually in a vertical position. Some types employ an adapter for the lower holder to provide a means of positioning the same at an angle so as not to interfere with operations on box structures and the like. The adapter, therefore, is usually reversible end for end, one end being designed to mount the holder in a vertical position and the other to mount the holder at 30 degrees from the vertical. However, special offset holders must be used to extend the welding tip or electrode beyond interference of the adapter, where the structure of the manufactured article demands. Further, where a 30 degree angle is not appropriate for the work a new adapter must be made to mount the holder at the desired angle resulting in much waste time and added expense in this regard. Moreover, disadvantages lie with present adapters in the necessity of changing water cooling connections when changing from a vertical disposition of the lower holder to the 30 degree position of the same, since the adapter must be removed from its copper mounting arm and reversed end for end.

It is, therefore, the prime object of the present invention to provide an adapter for spot welding machines which can be fitted to any size or make of machine and which is capable of disposing the electrode in a vertical, horizontal or angular position.

It is a further object of the present invention to provide an adapter of this type which generally comprises two brass castings forming a clamp and connected by screws. The front portions of the clamp or adapter hold disc means designed to mount an electrode at an angular position determined by adjustment.

A still further object of the present invention is to provide an adapter as before, whereby cooling connections need not be changed when the angular disposition of the electrode is changed, other than when changing from the true horizontal position to any other.

With these and other objects in view, the present invention generally comprises clamping means designed to be mounted on a conventional spot welding machine to constitute the lower electrode supporting element therefor. Disc means are mounted in the unsupported end of the clamp or adapter and are designed to receive the lower electrode holder of the machine. One end of the holder mounts an electrode and the other end thereof mounts means for connecting to a water cooling system. The clamp has a through bore whereby the discs, upon being rotated appropriately may accommodate an electrode holder therethrough and hold the same in a fixed horizontal position. Clamping screws are provided in the body of the clamp for causing the disc means to tightly engage the holder and fix the same relative to the arm of the machine. The discs may be rotated upon release of the clamping screws and the electrode removed and reinserted and rotated and fixed to dispose the same at an angle to the axial line of the adapter. Preferably, the discs are serrated in conjunction with the mating faces of the adapter whereby the angle and adjustment may be firmly fixed, and the electrode accommodating channels of the discs and the electrode therefor are threaded to prevent axial movement of the electrode under axial load.

Other objects of the present invention will be revealed by study of the following specification in conjunction with the accompanying drawings.

In the drawings,

Figure 4 is a perspective view of the device showing an electrode holder disposed at an angle relative to the axial line of the adapter or clamping means.

Figure 5 is a perspective view of an alternative form of the coolant connecting means on the electrode holder.

Figure 6 is a view on line 6—6 of Figure 5 being a cutaway view of the alternative form of electrode holder coolant connecting means.

Figure 7 is a perspective view of the present adapter showing an electrode holder and electrode held thereby in a horizontal or axial position.

Figure 3:
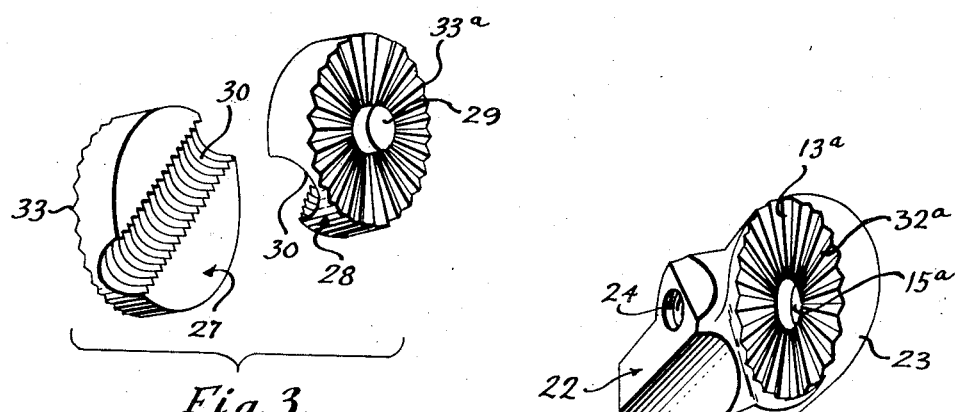
Figure 3 is a perspective view of the preferred type of discs mountable in the present holder.
Figure 2:
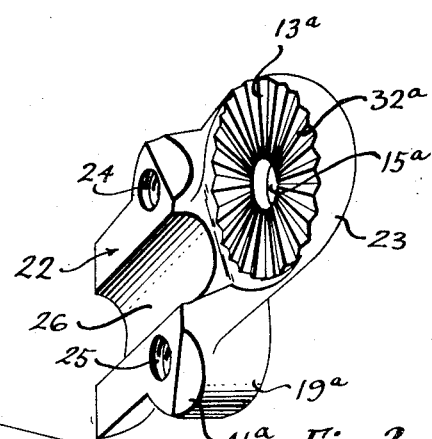
Figure 2 is a perspective view of a co-operating element of the clamping means of Figure 1.
Figure 1:
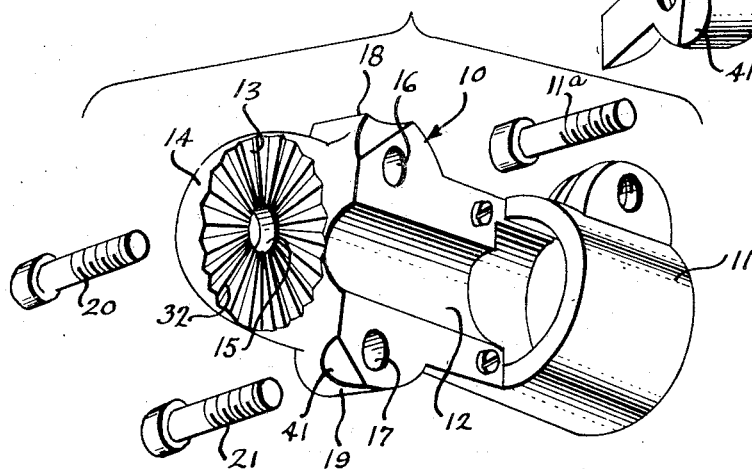
Figure 1 is a perspective view of a unitary casting and constitutes one element of the adapter or clamp indicating the clamping screws therefor.

Referring to the drawings, the clamping means of the present invention comprise a body 10 designed to clamp onto a standard copper arm or mounting bar (not shown) of a conventional welding machine by the split ring clamping element 11 employing bolt means 11a. An axial channel 12 extends to the inner face 13 of the bracket arm 14, the latter having a centrally disposed bore 15. Bores 16 and 17 in the lug portions 18 and 19 are designed to accommodate clamping bolts 20 and 21. A co-operating clamping element 22 extending to form a bracket arm 23 is mountable co-operatively on the body 10 by the bolts 20 and 21 engaging in the threaded bores 24 and 25 thereof. The co-operating clamping element 22 also has an axial channel 26 corresponding to the channel 12 of the body 10.

The bracket arms described are designed to mount disc means 27 and 28, the latter having an axial lug 29 designed to be accommodated in the bores 15 and 15a of the bracket arms 14 and 23. Each disc has a channel 30 to receive an electrode holder such as holder 31 of Figure 4. Preferably, the channels 30 and the body of the holder 31 are threaded as indicated whereby thrust on the holder will not disturb its position relative to the discs or the body 10 as indicated in Figure 4.

It is obvious that when the clamping screws 20 and 21 are loosened the angular disposition of the holder 31 relative to the axis of the adapter may be adjusted by rotating the discs 27 and 28 together to a desired position. In this connection, it is relevant to point out that in the preferable form the inner faces 13 and 13a of the bracket arms 14 and 23 are serrated and have radial teeth 32 and 32a as shown. Discs 27 and 28 are co-operatively serrated, having radial teeth 33 and 33a whereby the discs may be held firmly at a predetermined angular position of the holder 31.

As in Figure 4, the electrode holder comprises a shell 34 mounting the electrode 35 and having a centrally disposed tube element 36 connecting to the water inlet fitting 37. The tube element 36 is disposed in spaced relation to the walls of the shell 34 providing an annular chamber 37a communicating to the outlet fitting 38. It is obvious, therefore, that a cooling medium, entering the fitting 37, will be conducted up the tube 36 and expelled into the chamber 37a from the open end 39 of the tube 36 and conducted by way of the chamber 37a to the outlet fitting 38 communicating through a suitable hose line (not shown) to a point of discharge.

An alternative form of holder is illustrated in Figures 5 and 6 in the disposition of the fittings thereon. Thus the holder 31a has a casting 40 mounting the fittings 37a and 38a which communicate to the inner structure of the holder as previously described and revealed in Figure 4.

The alternative form of mounting the fitting means shown, eliminates interference of coolant lines to the holder 31a particularly when the latter is disposed at the limiting angular position, that is, when engaging the lug portions 19 and 19a of the bracket arms in the area of the cleft shoulders 41 and 41a. This limiting position corresponds to a disposition of the electrode at 30 degrees from the true vertical but it will be realized that this limitation is preferred with regard to present production requirements in spot welding machines and a mere alteration of the proportions would afford a larger angle in this connection.

In many operations, it is desirable to have a horizontal type holder 42 substantially as indicated in Figure 7, mounting an electrode 43 at an angle to the axis of the holder. In this type of construction it is not always necessary to provide cooling means for the holder and, therefore, it may be passed through accommodating channels 30 of the discs 27 and 28 and rest in the channels 12 and 26 of the body 10 and co-operating clamp 22 respectively. The holder may be adjusted axially, depending on the reach desired and due to the nature of the loading it usually is not necessary to provide threaded means 30 on the discs for this type.

In order to change the angular disposition of the holder as shown in Figure 4, it is merely necessary to loosen the bolts 30 and 31 and rotate the holder to a new position and clamp the same by fixing these bolts. The coolant lines need not be changed nor need the complete adapter be reversed as in present machines, and, therefore, a great saving in time is effected where my invention is employed.

Basically, the present adapter comprises a clamping means mountable on a conventional spot welding machine supporting a pair of discs designed to mount an electrode as described. The electrode and the discs are capable of adjustment to dispose the electrode holder at various angles to facilitate welding operations. Further, the holder is adjustable axially in the discs to provide adjustment in reach. The serration of the discs is not necessary for light welding machines where pressures are not excessive and the same also applies to the inclusion of the thread means 30 and co-operating thread means of the electrode holder. It is apparent, therefore, that many alternatives are possible in the provision of fastening means for the discs in the bracket arms and the holder in the discs along with modifications in general design without departing from the spirit of the present invention. It is submitted, therefore, that the present disclosure should not limit the scope of my invention in any way other than that indicated by the following claims.

What I claim as my invention is:

1. An adapter for spot welding machines comprising a body having a clamp designed to fasten on an electrode arm of a conventional machine, disc means rotatably mounted in said body, an electrode holder mountable in said disc means and designed to support a welding electrode, said discs being rotatable to dispose said holder at an angle to the axis of said body and said holder being mounted in said discs to dispose the welding electrode at a predetermined distance from the adjacent portions of the body and the discs, and means in connection with the body whereby said discs and said holder are fixed in positions of adjustment.

2. An adapter for spot welding machines as claimed in claim 1 and bracket arms extending from the body, the inner faces of said arms being radially serrated, said discs being serrated on their outer faces to mate with the inner faces of said bracket arms, a centrally disposed lug extending from the outer face of each disc and designed to be accommodated in a centrally disposed bore in each bracket arm, said holder having thread means throughout a substantial portion of its length, said discs having thread means designed to mate with the threads of said holder to mount the latter therebetween.

3. An adapter comprising a body having clamping means thereto designed to mount the same on an electrode arm of a conventional spot welding machine, a bracket arm extending from said body, a co-operating element mountable on said body, a bracket arm extending from said element, disc means mountable between said bracket arms, an electrode holder mountable between said disc means and designed to be rotated therewith in said bracket arms to dispose said holder in angular relation to the axis of said body, an axial channel in said body and said clamping element designed to accommodate said holder when the same is disposed in the axial line of said adapter, and means in connection with said body and said clamping element for fixing said discs and said electrode holder at predetermined positions of adjustment.

4. An adapter for spot welding machines comprising a body adapted for detachable mounting on an electrode arm of a conventional machine, two discs rotatably mounted in said body, said discs being designed to retain an electrode holder between opposed faces thereof and being rotatable within said body to dispose a holder retained thereby at a desired angle to the axis of said body, and locking means for securing said discs in fixed position of adjustment within said body.

5. An adapter for spot welding machines as claimed in claim 4 in which said body has opposed spaced apart bracket arms extending therefrom, said discs being retained between said brackets, the inner faces of said arms being radially serrated, said discs being serrated on their outer faces to mate with the inner faces of said bracket arms, each of said discs having a centrally disposed lug extending from its outer face, each of said bracket arms having a bore centrally located of said radial serrations thereof adapted to accommodate said lugs.

6. An adapter comprising a body adapted for detachable mounting on an electrode arm of a conventional spot welding machine, a bracket arm extending from said body, a cooperating element mountable on said body, a bracket arm extending from said element, two discs rotatably mountable between said bracket arms, said discs being adapted to retain an electrode holder therebetween and being designed for rotation within said bracket arms to dispose said holder retained thereby in angular relation to the axis of said body, said body and clamping elements having an axial channel designed to accommodate a holder retained by the body when it is disposed in axial line of said adapter and means in connection with said body for clamping said element for fixing said disc and said electrode holder at predetermined positions of adjustment.

ERNEST CRABTREE.

REFERENCES CITED

The following references are of record in the file of this patent:

UNITED STATES PATENTS

| Number | Name | Date |
|---|---|---|
| 2,041,913 | Fassler | May 26, 1936 |